United States Patent Office 3,541,733
Patented Nov. 24, 1970

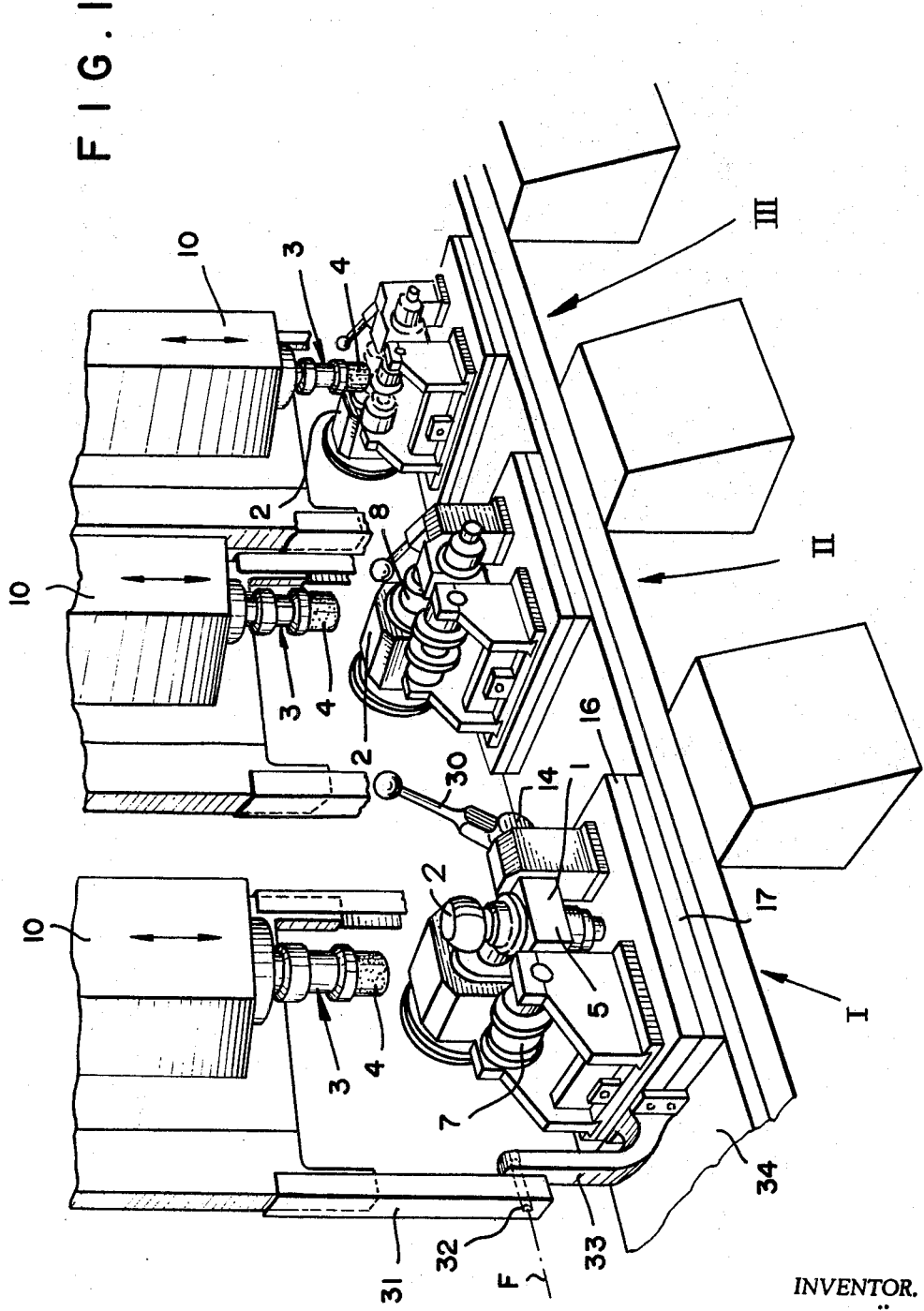

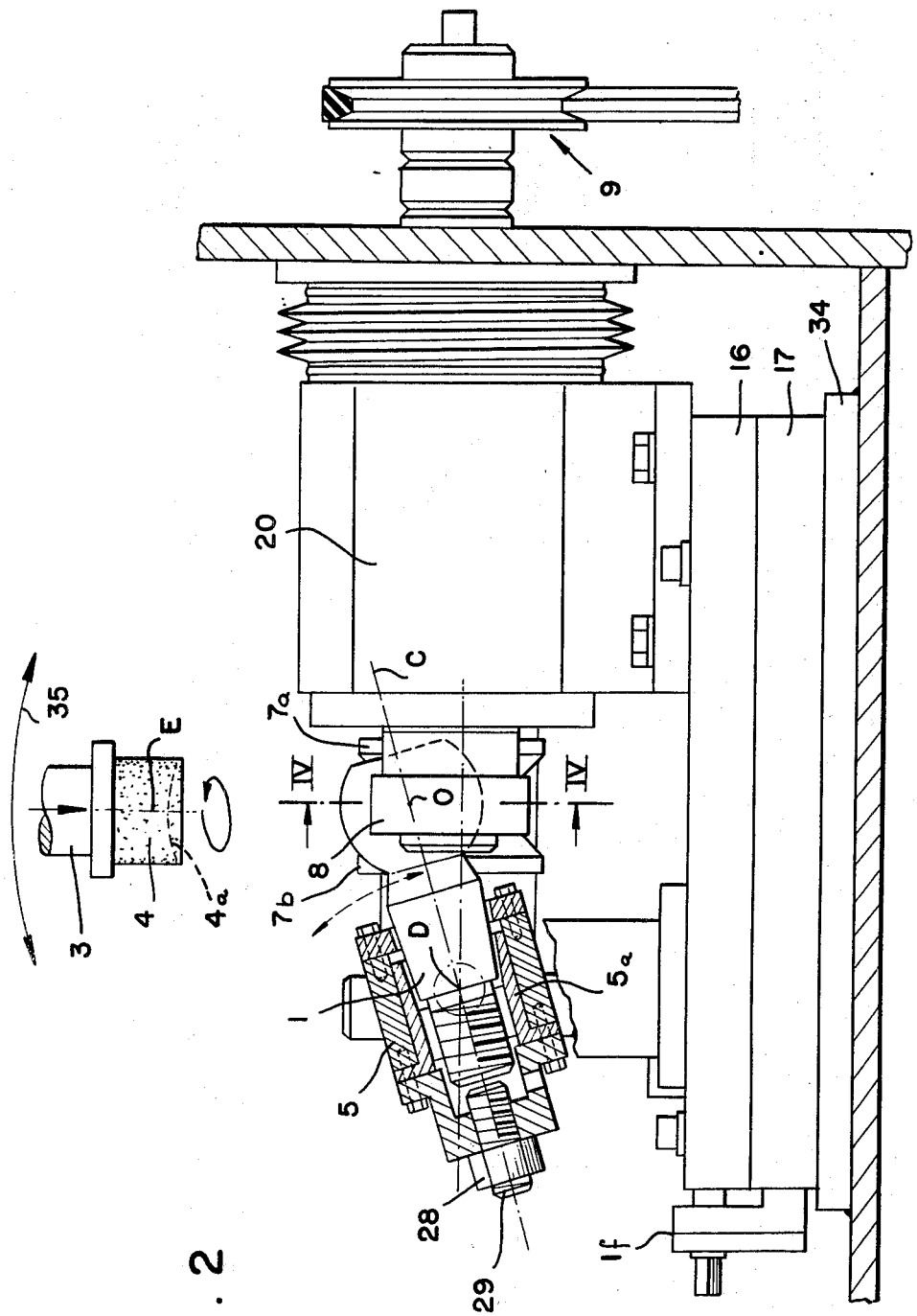

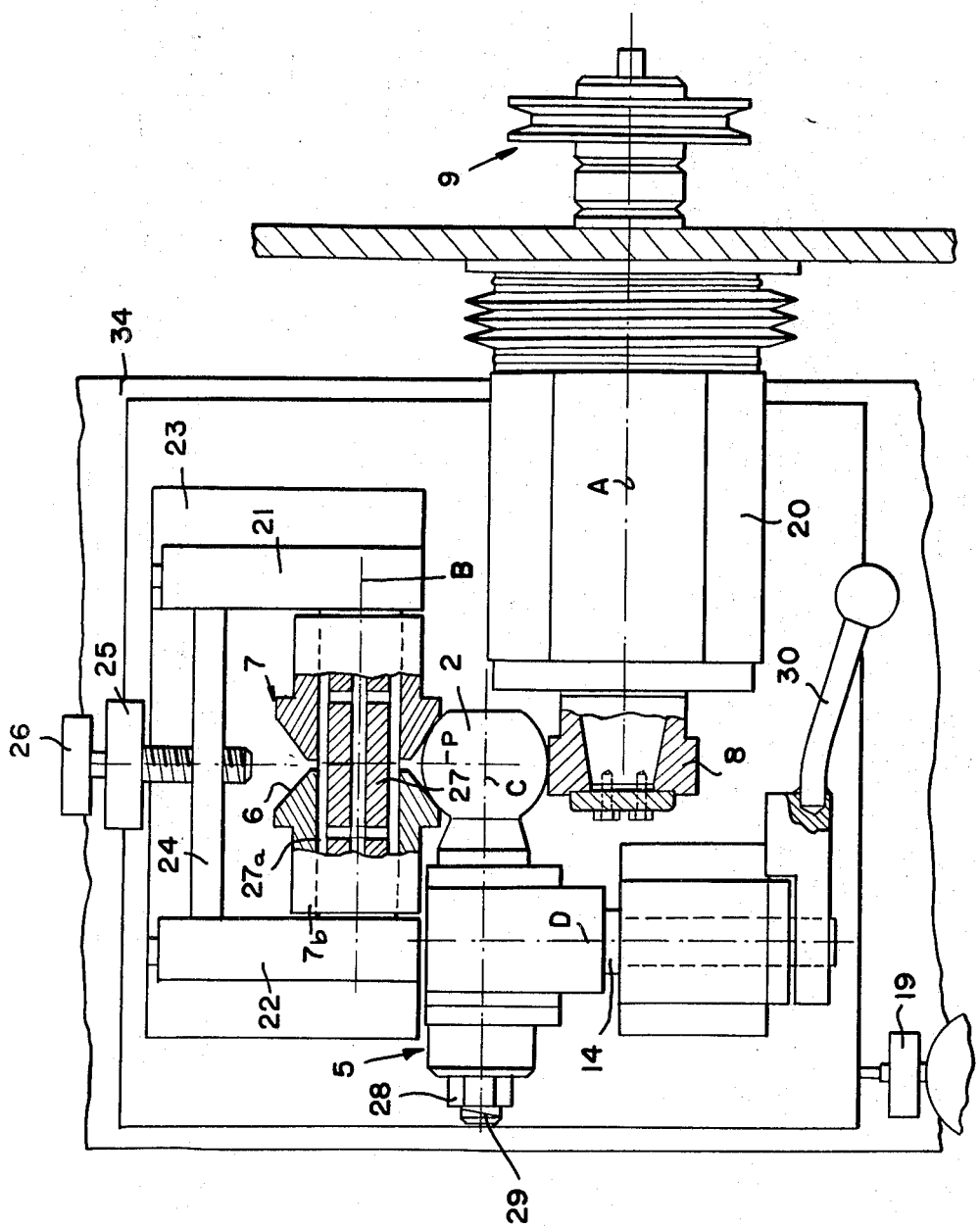

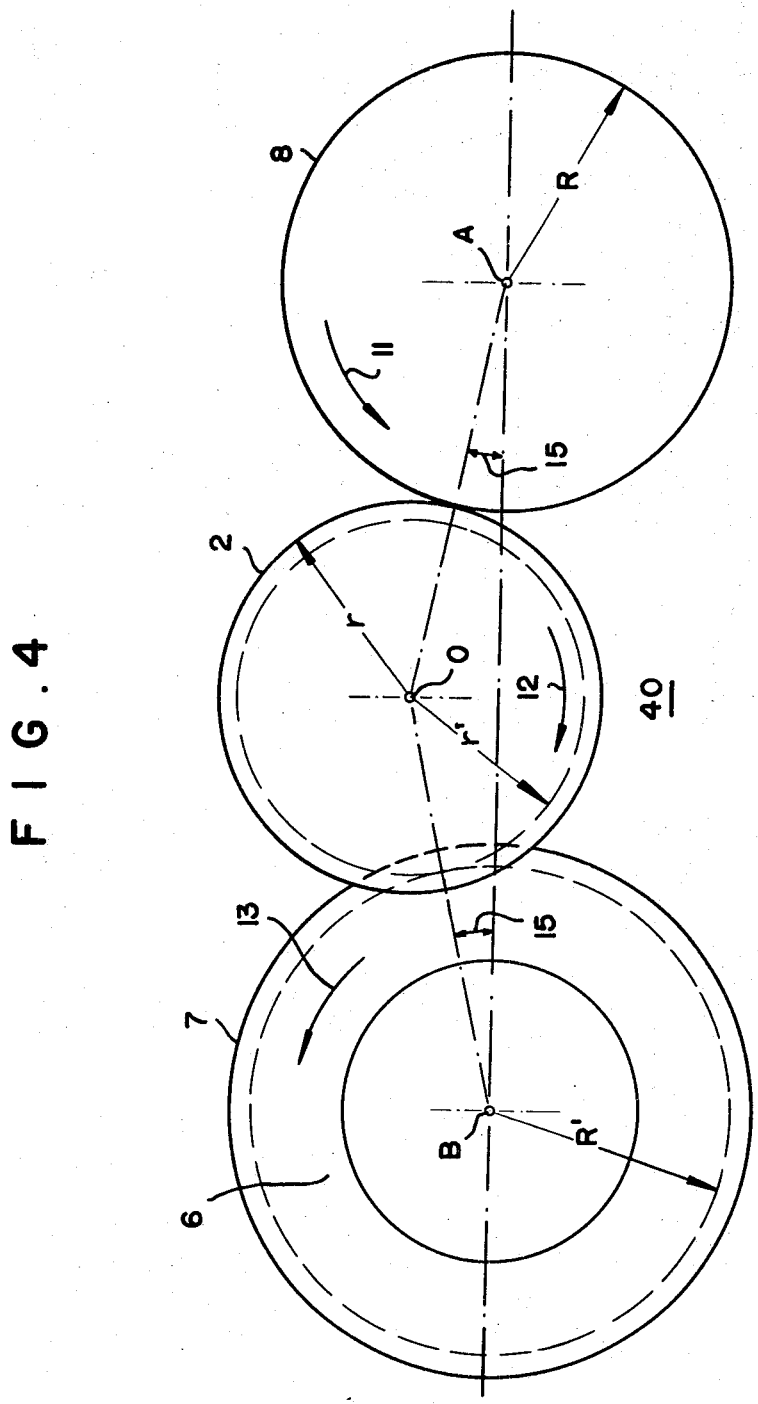

3,541,733
APPARATUS FOR MACHINING SPHERICAL HEADS OF ELONGATE WORKPIECES
Rudolf Schwär, Neviges, Germany, assignor to Maschinenfabrik Ernst Thielenhaus, Wuppertal-Barmen, Germany, a corporation of Germany
Filed Aug. 5, 1968, Ser. No. 750,099
Claims priority, application Germany, Aug. 3, 1967, 1,652,116
Int. Cl. B24b 7/00
U.S. Cl. 51—55                                10 Claims

ABSTRACT OF THE DISCLOSURE

To machine a spherical head of a pin, rod or other elongate workpiece, the shank of the latter is loosely mounted in a chuck with freedom of swinging in a plane between two parallel rollers whose spacing is less than the diameter of the workpiece head whereby the latter comes to rest in the nip of these rollers as one of them is rotated in a sense tending to draw the workpiece deeper into the nip. Within the plane of swing, an abrasive tool with a concave working surface of a curvature confronting to that of the workpiece head is brought to bear upon the latter while being rotated about its own axis.

---

My present invention relates to an apparatus for machining, e.g., honing or polishing, a spherical head of an elongate workpiece such as a rod or pin integrally cast with the male member of a ball joint.

Conventional devices of this type utilize chucks or similar workpiece holders rotatable about the workpiece axis so that the accuracy of the machining operation depends to a large extent upon the centering of the ball head with reference to the shank portion of the workpiece. If the two workpiece portions are not precisely coaxial, the ball will not be machined to the desired sphericity and may, in fact, undergo an aggravated deviation from its intended shape.

The general object of this invention is to provide means for machining the spherical head of a workpiece of this type in a manner independent of the exact geometry of its shank.

Another object is to provide an apparatus for the purpose described which can be conveniently adapted to a variety of workpiece sizes.

These objects are realized, in accordance with my present invention, by the provision of two parallel rollers separated by a gap whose width is less than the diameter of the workpiece head to be machined, one of these rollers being driven so as to rotate about its axis in a sense tending to draw the head deeper into the nip of the two rollers. The workpiece shank is rotatably held in a support which allows at least limited freedom of displacement in a plane parallel to and located between the two roller axes, preferably by swingably mounting the support on a pivotal axis perpendicular to that plane. An abrasive tool with a concave working surface confronting the spherical workpiece head, and conforming to the curvature of that head, is mounted for movement with the aforesaid plane into contact with the head, this tool having an axis of symmetry in that plane about which it is rotatable while engaging the spherical head surface. The head, on being thus machined, adapts its position to the shape of the tool since it is not constrained by the chuck; in fact, the latter may engage the shank portion of the workpiece with a loose fit and freedom of at least limited axial motion.

In order to help retain the center of curvature of the workpiece head in a predetermined axial position, I prefer to give the second, usually nondriven roller a generally diverging biconical periphery defining a restricted waistline in an equatorial plane of the head. This centering roller may be substantially hourglass-shaped or may have a triangular or trapezoidal groove similar to that of a V-pulley. The workpiece head is thus located by three-point contact at a level which, advantageously, is slightly above a level containing the two roller axes; the rotary tool, on descending toward the rollers, then furnishes a fourth point of contact (actually, an entire contact circle) uniquely defining the position of the center of curvature of the sphere. As the driven roller entrains the head to make it rotate about a workpiece axis generally coinciding with the centerline of its shank, the concurrent rotation of the tool about its own axis of symmetry lets its working face sweep a broad segment of the sphere surface. This segment need not be centered on an equatorial plane transverse to the workpiece axis but, as will be desirable in many instances, may be shifted away from the tool shank by an upward and forward inclination of that axis with reference to the plane of the roller axes. The relative rotation of tool and workpiece results in a mutual truing of their spherical surfaces.

The invention will be described in greater detail with reference to the accompanying drawing in which:

FIG. 1 is a perspective view of a set of machining devices according to my invention, partly broken away for clarity;

FIG. 2 is a side view, partly in section, of one of the devices of FIG. 1;

FIG. 3 is a top view of the assembly of FIG. 2; and

FIG. 4 is a cross-sectional view of the assembly taken on the line IV—IV of FIG. 2.

In FIG. 1 I have shown a set of three identical units I, II and III, one of them being illustrated in greater detail in FIGS. 2–4. In each unit a workpiece to be machined comprises a ball head 2 rigid with a shank 1 and rotatable about an inclined axis C, the shank being loosely held in a chuck 5. Ball 2 rests on two parallel rollers, i.e., a roller 8 with a horizontal axis A and a roller 7 with a horizontal axis B. The assembly is mounted on a bead 34 by means of two relatively movable mounting plates 16 and 17, similar to a pair of cross-slides, whose position with respect to bed 34 may be adjusted by means of stops 18, 19.

The chuck 5 has the form of a bushing swingable about an axis D, transverse to axis C, on a shaft 14 carrying a handle 30. The rear of this chuck 5 is provided with a back stop comprising a stud 29 and a locknut 28.

The first or driving roller 8 is rotated by an electric motor, not shown, via a transmission 9 through a flexible coupling and speed-reduction gearing, not further illustrated, received in a housing 20.

The second or centering roller 7 comprises two frustoconical halves 7a and 7b riding on a common shaft 27 with cooling channels 27a and held thereon, not shown, the two roller halves defining a triangular groove 6 between them. The shaft 27 is journaled in side plates 21 and 22 slidable on a base 23 and joined by a traverse 24. A screw 26 threaded into a lug 25 on mounting plate 16 engages the traverse 24 to permit adjustment of the gap between the rollers 7 and 8, the width of this gap being less than the diameter of ball 2. The separation of the roller halves 7a, 7b may also be limitedly variable for adjustment of the effective roller spacing.

FIG. 4 shows how the ball 2 is held between the rollers 8 and 7. The points of intersection of axes A, B and C with a transverse plane P (FIG. 3), bisecting the roller 7 at its waistline 6, define an isosceles triangle with an acute base angle 15 ranging preferably between 10° and 15°, being here equal to about 12°. The center O of ball 2 coincides with the point of intersection of axis C and plane P. The respective senses of rotation are indicated by arrows 11, 12 and 13. It can be seen that rotation of the driven roller 8 entrains the workpiece 1, 2 and the centering roller 7 while tending to draw the ball 2 into the nip 10 of the rollers 7 and 8. For this purpose the roller 7 should not be driven, or should be driven at a somewhat slower rate than roller 8 (taking into account the relative step-up ratio between radii R, r of roller 8 and head 2 and between radii R', r' of the circles of contact of roller 7 and head 2) in order to exert a certain drag upon the workpiece. With the geometrical arrangement illustrated in FIG. 4, the driving roller 8 will rotate the workpiece 1 substantially without slippage even if the roller surfaces are highly polished.

A generally cup-shaped tool 4 with an abrasive working face 4a of spherically concave configuration, having the same radius of curvature r as the head 2, is mounted in a tool holder 3 rotatable on a vertically movable support 10. The axis of symmetry E of tool 4 is trained upon the center O of ball 2 but the zone of engagement between the ball and the tool upon, a lowering of the latter onto the workpiece, is shifted forwardly toward the flattened end of the ball by virtue of the inclination of workpiece axis C. By making the tool support 10 swingable about an axis F through the center O in the plane of axis C, e.g., with the aid of a pivotal connection 32 between a mounting frame 31 for support 10 and a pair of brackets 33 (only one shown) on plate 16, this working zone may be extending toward the rear of the ball 2, i.e., toward its junction with shank 1.

As illustrated for the unit I in FIG. 1, the workpiece is first inserted into the chuck 5 with the handle 30 swung upwardly so that the workpiece axis is approximately vertical. As indicated for unit II, the handle 30 is then swung forwardly (i.e., clockwise as viewed in FIG. 2) through about 90° so that the head 2 occupies its working position shown in FIGS. 2–4. Next, the tool support 10 is slid down in its frame 31, as illustrated for unit III, to machine the workpiece which turns in the aforedescribed manner about its own axis C as the tool 4 rapidly rotates about axis E to machine a segmental zone of the spherical head. Swinging the tool support 10 and frame 31 about its pivot 32, as indicated by arrow 35 in FIG. 2, enables a complete machining of the spherical head surface.

If ball heads of different diameters are to be worked on, the spacing of rollers 7 and 8 may be adjusted and the plates 16 and 17 may be shifted to maintain the center O of the ball properly in line with axes E and F.

Chuck 5 has a liner 5a of suitable bearing material facilitating rotation of shank 1 therein. The shape of the chuck may be altered to accommodate different workpieces of the general type described, e.g., rods or pitmans with ball heads on both ends; these and other modifications and adaptations, readily apparent to persons skilled in the art, are intended to be embraced within the spirit and scope of my invention as defined in the appended claims.

I claim:

1. An apparatus for machining a spherical head of an elongate workpiece having a shank adjoining said head, comprising:
   a first roller and a second roller with parallel axes rotatably disposed alongside each other with a mutual separation less than the diameter of said head;
   support means for said workpiece engageable with said shank and adapted to position said head rotatably between said rollers with freedom of at least limited displacement in a plane parallel to said axes;
   first drive means for rotating said first roller in a sense tending to draw said head into the nip of said rollers;
   an abrasive tool with a concave working surface confronting said head and conforming to the curvature thereof, said tool being mounted for movement within said plane into contact with said head and having an axis of symmetry in said plane;
   and second drive means for rotating said tool about said axis of symmetry during contact with said head.

2. An apparatus as defined in claim 1 wherein said second roller has a generally divergingly biconical periphery with a restricted waistline in an equatorial plane of said head.

3. An apparatus as defined in claim 2 wherein said second roller consists of two substantially symmetrical halves meeting at said waistline.

4. An apparatus as defined in claim 2 wherein the axes of said rollers are substantially horizontal and on the same level, said support means defining a workpiece axis intersecting the plane of said waistline above said level.

5. An apparatus as defined in claim 4 wherein said workpiece axis is upwardly and forwardly inclined above said level in an operating position of said support means.

6. An apparatus as defined in claim 5 wherein the intersections of the roller axes and the workpiece axis with the plane of said waistline define a substantially isosceles triangle.

7. An apparatus as defined in claim 6 wherein the base angles of said isosceles triangle range between substantially 10° and 15°.

8. An aparatus as defined in claim 5 wherein said tool is provided with a holder swingable about a line transverse to said workpiece axis.

9. An apparatus as defined in claim 2 wherein said support means is swingable about a pivotal axis perpendicular to said plane.

10. An apparatus as defined in claim 1 wherein said support means comprises a chuck receiving said shank with freedom of at least limited axial displacement of the latter.

References Cited

UNITED STATES PATENTS

| 2,039,223 | 4/1936 | Hutchinson | 51—129 |
| 2,418,871 | 4/1947 | Danielson | 51—103 |
| 2,481,173 | 9/1949 | Stenwall | 51—236 |

WILLIAM R. ARMSTRONG, Primary Examiner

U.S. Cl. X.R.

51—33.1, 236